United States Patent
Takikawa et al.

(10) Patent No.: US 10,919,714 B2
(45) Date of Patent: Feb. 16, 2021

(54) SOLID PARTICLE CARRYING METHOD AND CARRYING SYSTEM

(71) Applicant: KANTO DENKA KOGYO CO., LTD., Tokyo (JP)

(72) Inventors: Go Takikawa, Okayama (JP); Shinsuke Katayama, Okayama (JP); Osamu Omae, Okayama (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/470,847

(22) PCT Filed: Mar. 16, 2018

(86) PCT No.: PCT/JP2018/010426
§ 371 (c)(1),
(2) Date: Jun. 18, 2019

(87) PCT Pub. No.: WO2018/169042
PCT Pub. Date: Sep. 20, 2018

(65) Prior Publication Data
US 2020/0087083 A1 Mar. 19, 2020

(30) Foreign Application Priority Data
Mar. 17, 2017 (JP) .............................. JP2017-053482

(51) Int. Cl.
*B65G 53/16* (2006.01)
*B01J 8/00* (2006.01)
*B01J 8/18* (2006.01)

(52) U.S. Cl.
CPC .............. *B65G 53/16* (2013.01); *B01J 8/003* (2013.01); *B01J 8/1827* (2013.01); *B01J 8/1872* (2013.01)

(58) Field of Classification Search
CPC ...................................................... B65G 53/16
See application file for complete search history.

(56) References Cited

U.S. PATENT DOCUMENTS 3,309,785 A * 3/1967 King ........................ B01J 8/08
 406/106
3,694,037 A * 9/1972 Feder ..................... B65G 53/06
 406/23

(Continued)

FOREIGN PATENT DOCUMENTS

| CN | 85109198 A | 7/1986 |
| CN | 2245601 Y | 1/1997 |

(Continued)

OTHER PUBLICATIONS

International Search Report, PCT/JP2018/010426, dated May 15, 2018.

(Continued)

*Primary Examiner* — William R Harp
(74) *Attorney, Agent, or Firm* — Nixon & Vanderhye

(57) ABSTRACT

In a method for gas-flow carrying a solid particle, the solid particle includes a solid substance generating a dissociation equilibrium reaction that dissociates at least one type of gas component, and the solid particle is carried by a gas flow containing the gas component. The average particle diameter of the solid particle is preferably 0.1-1.0 mm. The solid particle is preferably carried by the gas flow in the state of a suspended flow, a fluidized flow, or a plug flow. The solid particle preferably includes a solid substance to generate a dissociation equilibrium reaction that dissociates at least one gas component and at least one solid component, and the solid particle is preferably carried by the gas flow in a carrying pipe and the solid particle or the solid component that has adhered to the interior surface of the carrying pipe is removed by the gas flow.

8 Claims, 1 Drawing Sheet

(56) References Cited

U.S. PATENT DOCUMENTS

| | | | |
|---|---|---|---|
| 4,770,793 A * | 9/1988 | Treffry-Goatley | B01D 63/06 |
| | | | 210/769 |
| 4,790,692 A | 12/1988 | Bunyoz et al. | |
| 4,892,123 A * | 1/1990 | Sheehan | B01J 8/0015 |
| | | | 141/44 |
| 4,900,200 A | 2/1990 | Harumoto et al. | |
| 5,156,902 A * | 10/1992 | Pieper | A61F 13/15577 |
| | | | 428/206 |
| 2003/0077215 A1 | 4/2003 | Kikuyama et al. | |
| 2008/0138674 A1 * | 6/2008 | Pez | H01M 8/04201 |
| | | | 429/419 |
| 2011/0189553 A1 | 8/2011 | Boyacisan et al. | |
| 2014/0369771 A1 | 12/2014 | Mautner et al. | |

FOREIGN PATENT DOCUMENTS

| | | |
|---|---|---|
| CN | 102177609 A | 9/2011 |
| CN | 104692126 A | 6/2015 |
| CN | 204607044 U | 9/2015 |
| JP | 08-012073 | 1/1996 |
| JP | 09-323822 | 12/1997 |
| JP | 11-79394 | 3/1999 |
| JP | 2001-163610 | 6/2001 |
| JP | 2014-123460 | 7/2014 |
| JP | 2015-000813 | 1/2015 |
| JP | 2015-040164 | 3/2015 |

OTHER PUBLICATIONS

Extended European Search Report issued in European Patent Application No. 18767053.4 dated Dec. 18, 2020.

* cited by examiner

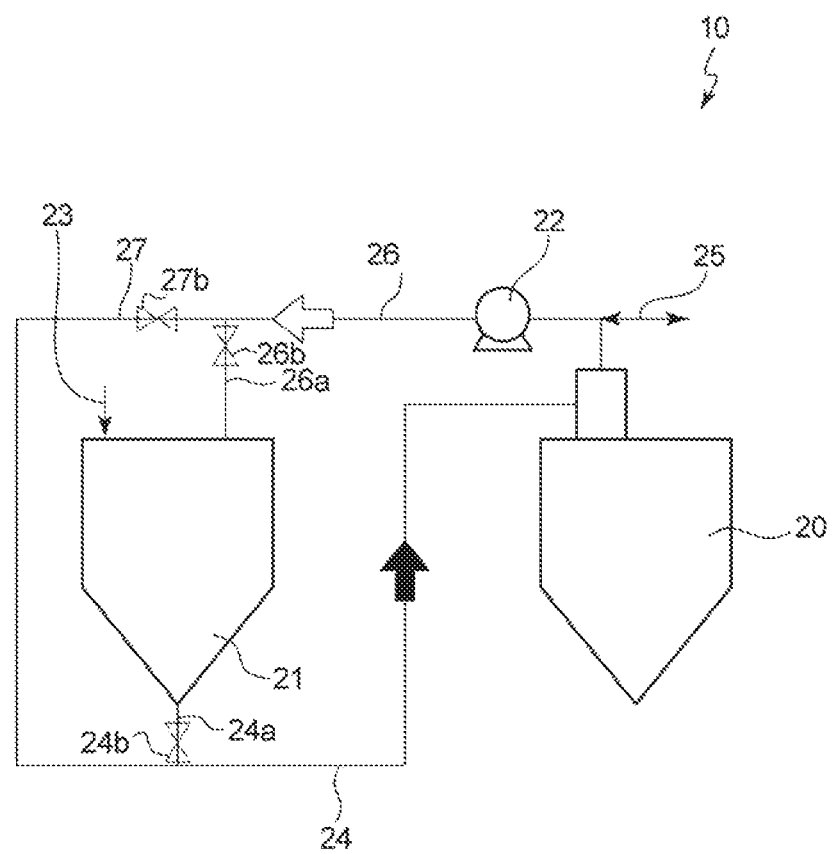

SOLID PARTICLE CARRYING METHOD AND CARRYING SYSTEM

TECHNICAL FIELD

The present invention relates to a solid particle conveying method and conveying system.

BACKGROUND ART

Conventionally, for example, when conveying solid particles as a raw material to facilities for producing products, conveying solid particles as a fuel to a combustion furnace, or discharging solid particles as a waste out of production facilities, or the like, pneumatic conveying that conveys these particles using a gas is performed.

For example, Patent Literature 1 describes a method in which a powder in a dried state is pressure-fed in a pipe using dry air.

Furthermore, Patent Literature 2 describes a method in which a clog in a powder transportation pipe is detected based on a pressure, and, if a clog is found, the inside of the pipe is washed through purging with a high pressure fluid.

CITATION LIST

Patent Literature

Patent Literature 1: JP H8-012073A
Patent Literature 2: JP H9-323822A

SUMMARY OF INVENTION

If solid particles are capable of undergoing a dissociation equilibrium reaction that dissociates another component in a gaseous phase, part of the solid particles may be dissociated and altered due to friction or the like during pneumatic conveying, and, in this case, it is difficult to maintain the quality. Furthermore, if such dissociation occurs, a generated altered matter or the like may be stuck to and clog a conveying path. Accordingly, conventionally, solid particles that are capable of undergoing a dissociation equilibrium reaction that dissociates another component in a gaseous phase cannot be subjected to pneumatic conveying, and have to be conveyed using a transportation device such as a conveyor. When a conveyor or the like is used, there is a limitation on selection of conveying paths and conveying vessels, which makes it difficult to reduce the conveying cost.

Accordingly, it is an object of the present invention to provide a solid particle conveying method that can solve the above-described disadvantages of conventional techniques.

The present inventors conducted an in-depth study, and found that, when conveying solid particles that are capable of undergoing a dissociation equilibrium reaction that dissociates a gas component, it is possible to convey the solid particles while suppressing dissociation, by conveying the solid particles using a gas flow containing the gas component.

The present invention is based on this finding, and provides a method for pneumatically conveying solid particles, wherein the solid particles comprise a solid material that is capable of undergoing a dissociation equilibrium reaction that dissociates at least one type of gas component, and the solid particles are conveyed by a gas flow containing the gas component.

BRIEF DESCRIPTION OF DRAWINGS

FIG. 1 is a schematic diagram showing an example of a conveying system that is suitably used for a conveying method of the present invention.

DESCRIPTION OF EMBODIMENTS

Hereinafter, a solid particle conveying method and conveying system of the present invention will be described by way of a preferred embodiment.

The solid particles that are to be conveyed in the present invention are made of a solid material that is capable of undergoing a dissociation equilibrium reaction that dissociates at least one type of gas component.

"Dissociation" is a common process in which complexes, molecules, salts, or the like are separated or divided to form smaller molecules, ions, or radicals. Furthermore, "equilibrium reaction" is a state in which, in a reversible reaction, a reaction speed in a forward direction and a reaction speed in a reverse direction become equal as the reaction progresses, and the composition ratios of raw materials and products do not apparently change.

"Capable of undergoing a dissociation equilibrium reaction that dissociates at least one type of gas component" may refer to any state in which there is a possibility that a dissociation equilibrium reaction in a gaseous phase theoretically occurs in a natural state at the temperature and the pressure when the solid particles are pneumatically conveyed. "Natural state" refers to a state in which no energy such as plasma is artificially applied in order to dissociate solid particles.

It is preferable that the solid material is capable of undergoing a dissociation equilibrium reaction that dissociates at least one type of gas component and at least one type of solid component, in order to easily obtain conveying stability in this conveying method. In this case, when a solid material is taken as A, a solid component is taken as B, a gas component is taken as C, the number of moles of the solid material is taken as x, the number of moles of the solid component is taken as y, and the number of moles of the gas component is taken as z, the dissociation equilibrium reaction formula is as below.

$$xA \leftrightarrows yB + zC$$

In the case in which the solid particles are capable of undergoing the dissociation equilibrium reaction of this formula, when, in an air-tight vessel, the molar concentration of the solid material A is taken as [A] (mol/L), the molar concentration of the solid component B is taken as [B] (mol/L), and the molar concentration of the gas component C is taken as [C] (mol/L), a dissociation constant K of the dissociation equilibrium reaction is as below.

$$K = \frac{[B]^y [C]^z}{[A]^x}$$

The gas component that is capable of being generated through dissociation of the solid particles may be any component as long as it is a gas component at ordinary temperature (25° C.) and ordinary pressure (1 atm), and the solid particles and the solid component that is capable of being generated through dissociation of the solid particles may be any component as long as they are solids at ordinary temperature (25° C.) and ordinary pressure (1 atm). More preferably, the gas component is a gas at a conveying atmosphere of the solid particles, that is, at a later-described preferable temperature and pressure of the gas flow containing the gas component, and, furthermore, the solid particles and the solid component that is capable of being generated through dissociation of the solid particles are solids at the later-described preferable temperature and pressure of the gas flow.

One of the characteristics of this conveying method is that the gas component that is capable of being dissociated from the solid particles through a dissociation equilibrium reaction is contained in a gas flow for conveying the solid particles. For example, if the solid particles are made of $LiPF_6$, the gas flow contains $PF_5$ based on the fact that $LiPF_6$ undergoes a dissociation equilibrium reaction of the formula below. $PF_5$ is a gas at ordinary temperature (25° C.) and ordinary pressure (1 atm), and LiF are solids at ordinary temperature and ordinary pressure.

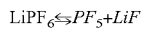

If the conveying atmosphere contains a specific gas component, the equilibrium of the dissociation equilibrium reaction shifts so as to reduce the amount of the gas component. That is to say, the reaction speed of the forward reaction (dissociation reaction) decreases, and the reaction speed of the reverse reaction (association reaction) increases. Accordingly, a conveying system 10 and a conveying method using the same can convey solid particles while suppressing a dissociation reaction of the solid particles.

The gas component that is contained in the gas flow may be a commercially available component, or may be a component produced by a known method. The gas flow may contain only the gas component, but, in view of cost reduction or gas flow handleability, it is also possible that the gas flow contains another gas in addition to the gas component. The other gas is preferably a gas that does not affect a dissociation equilibrium reaction of the solid particles, in order to easily prevent dissociation of the solid particles by using the gas component. The gas that does not affect a dissociation equilibrium reaction of the solid particles may be a gas that does not chemically react with any of the solid particles, the solid component, and the gas component. Specific examples of gases that do not affect dissociation equilibrium reactions of the solid particles include inert gas such as argon gas, nitrogen gas, and helium gas, and dry air whose dew point has been adjusted.

If the gas flow is a mixed gas of the gas component and the inert gas, the ratio (volume ratio) between the gas component and the inert gas in the gas flow in former/latter is preferably 1/10000 or greater in order to easily prevent dissociation of the solid particles. The ratio (volume ratio) between the gas component and the inert gas in the gas flow in former/latter is preferably 1/25 or less in view of cost reduction or gas flow handleability. From these points of view, the ratio (volume ratio) between the gas component and the inert gas in the gas flow is more preferably from 1/6000 to 1/25. However, it is also possible that the gas component is 100 vol %. Furthermore, in the gas flow, the proportion of gas other than the gas component and the inert gas is preferably 1 vol % or less, and more preferably 0.1 vol % or less.

The temperature of the conveying atmosphere of the solid particles, that is, the gas flow is preferably equal to or greater than the outside temperature in order to easily convey the solid particles without adjusting the temperature, and is preferably 60° C. or less in order to more easily suppress dissociation of the solid particles. From this point of view, the temperature of the gas flow is more preferably from the ambient temperature to 60° C., and particularly preferably from the ambient temperature to 40° C. The ambient temperature may be, for example, 5° C. or more, but there is no limitation to this.

If the solid material for forming the solid particles is $LiPF_6$ or $LiBF_4$ as described later, the moisture amount in the gas flow is preferably as small as possible, in order to prevent a reaction between water and the solid material. For example, the moisture amount in the gas flow is preferably 1000 ppm or less, and more preferably 100 ppm or less, in volume.

The solid particles may be conveyed by the gas flow in any state of a floating flow, a fluidized flow, or a plug flow.

The floating flow is a flow in which the gas velocity in a conveying pipe is high and particles move while flying, and belongs to a so-called low-concentration conveying mode. The floating flow includes a floating pipe bottom flow in which the gas velocity is relatively low and particles are concentrated at the bottom of a conveying pipe, and a floating dispersion flow in which the gas velocity is high and particles are conveyed in a dispersed state in a conveying pipe.

The fluidized flow is a flow in which particles move while sliding along the bottom of a conveying pipe in the form of a collective flow, like sand on a sand dune, and is a type of high-concentration conveying mode. In the case of a coarse powder, the principle for forming a fluidized flow is substantially similar to that of a plug flow. Note that there is no or almost no portion in which collective particles obstruct a conveying pipe cross-section similar to a plug flow. In the case of a fine powder, the conveying mode uses a fluidization principle based on a flushing phenomenon, and is particularly suited to convey a fine powder with high flushing properties because it is likely to contain air.

The plug flow is a flow in which particles move without flying in a collective form like a plug, and is a type of high-concentration conveying mode. In a system using this conveying mode, the amount of air consumed is small, the conveying efficiency is high, and materials that are being conveyed are unlikely to crush or wear down pipes.

The pneumatic conveying apparatus may be of a low-pressure suction type, a low-pressure feeding type, a high-pressure feeding type, a plug conveying type, or an air sliding type, and there is no limitation on the type. Typically, the conveying through a floating flow is performed using a low-pressure suction type or low-pressure feeding type apparatus, the conveying through a fluidized flow is performed using a high-pressure feeding type apparatus, and the conveying through a plug flow is performed using a plug conveying or air sliding apparatus.

The distance by which the solid particles are pneumatically conveyed is, for example, preferably from 2 to 100 m, and particularly preferably from 5 to 50 in. in order to easily obtain an advantage of the pneumatic conveying that the flexibility in selecting conveying paths is high, and in order to easily convey particles. Furthermore, in order to easily obtain an advantage of the pneumatic conveying and to easily convey particles, the end point of pneumatic conveying is preferably higher than the start point of the pneumatic conveying, and more preferably higher than the start point by 0.5 to 50 m. Furthermore, the diameter (inner diameter) of a conveying pipe may be typically from 2.5 to 13.5 cm.

The average particle size of the solid particles is preferably 1 mm or less, in order to allow the solid particles to be easily conveyed by the gas flow in the above-described floating flow, fluidized flow, or plug flow state, in particular, in the fluidized flow or plug flow state. Furthermore, the average particle size is preferably 0.01 mm or more, in order to easily prevent the particles from aggregating and to prevent the particles from being stuck to a conveying pipe. From these points of view, the average particle size of the solid particles is more preferably from 0.01 to 1.0 mm, particularly preferably from 0.05 to 0.4 mm, and most preferably from 0.1 to 0.4 mm. The average particle size of the solid particles is measured as below. "Average particle size" described herein is not limited to those obtained when the solid particles are being conveyed by the gas flow, but also may be obtained by measuring the solid particles either before or after the conveying as long as they are not subjected to treatment that apparently changes the particle size (pulverization, etc.).

Method for Measuring Average Particle Size

After the particle size distribution is measured, the average particle size is calculated.

The method for measuring the particle size distribution may be commonly used methods using a sieve, laser diffraction, or the like. In this specification, it is assumed that the method for measuring the particle size distribution necessary to calculate the average particle size is a method using a sieve. Even in the case in which the average particle size measured by other methods such as those using laser diffraction or the like is not included in the above-described range, it is assumed that the average particle size belongs to the range, as long as it is within the range according to the method using a sieve. The average particle size measured by the method using a sieve is a weighted average particle size calculated from the weight distribution. Specifically, the average particle size is measured as defined in JISZ8815 "Test sieving—General requirements", using a dry method, at a temperature of 15 to 30° C., in an inert gas atmosphere with a dew point of −20° C. or less, using sieves in four or more stages.

The pressure of the gas flow significantly varies depending on which state of a floating flow, a fluidized flow, or a plug flow is applied to conveying of the solid particles, but, typically, in order to improve conveying efficiency and to further suppress dissociation by preventing generation of frictional heat between the particles, the pressure is preferably from −50 kPaG to the atmospheric pressure in the case of suction, and is preferably from the atmospheric pressure to 400 kPaG in the case of pressure feeding.

The solid particles are preferably conveyed by the gas flow in a conveying pipe. It is more preferable that the solid particles or a solid component generated through dissociation of the solid particles, stuck to the inner surface of a conveying pipe, is removed by the gas flow. Specific examples in which the solid component or the solid particles stuck to the inner surface of a conveying pipe are removed by the gas flow will be described later.

The solid particles are preferably conveyed in a closed conveying path. "Closed" described herein refers to the sealing degree at which the solid particles are prevented from being dispersed to the outside. More preferably, solid particles are conveyed in an airtight conveying path, in order to suppress alteration of the solid particles by preventing moisture and the like from entering from the outside, and in order to prevent the gas component in the gas flow from flowing out.

Furthermore, in the present invention, it is preferable that the gas flow is circulated in a conveying path, in order to reduce the conveying cost by improving usage efficiency of the gas component that is used for conveying, and it is particularly preferable that the gas flow is circulated in an airtight conveying path.

The solid material is preferably a fluorine-containing inorganic salt, and particularly preferably a salt having $PF_6^-$ or $BF_4^-$ as an anion. The salt having $PF_6^-$ or $BF_4^-$ as an anion is capable of readily undergoing a dissociation equilibrium reaction that dissociates $PF_5$ or $BF_3$ that is a fluorine compound of the gas, at ordinary temperature (25° C.). Of these, an alkali metal salt of $PF_6^-$ or $BF_4^-$ is preferable because it is easily available and is useful due to its wide applicability in various fields, such as batteries. In particular, $LiPF_6$ and $LiBF_4$ are much in demand as electrolytes for lithium batteries, and are preferable due to an industrial effect that the production cost of electrolytes and lithium batteries using the same can be reduced by pneumatically conveying these materials.

Note that $LiPF_6$ is capable of undergoing a dissociation equilibrium reaction as expressed by the formula above, at ordinary temperature and ordinary pressure and at the above-described preferable temperature and pressure of the gas flow.

Furthermore, $LiBF_4$ is capable of undergoing a dissociation equilibrium reaction of the formula below, at ordinary temperature and ordinary pressure and at the above-described preferable temperature and pressure of the gas flow. $BF_3$ is a gas at ordinary temperature and ordinary pressure.

In order to improve an advantage of an effect that the solid material from which a gas component is capable of dissociation can be pneumatically conveyed while suppressing the dissociation, the proportion of the solid material that is capable of undergoing a dissociation equilibrium reaction that dissociates at least one type of gas component, with respect to the solid particles that are to be conveyed, is preferably 10 mass % or more, more preferably 30 mass % or more, even more preferably 50 mass % or more, particularly preferably 70 mass % or more, and most preferably 90 mass % or more. The content can be measured through ion chromatography, for example, if the solid material is $LiPF_6$ or $LiBF_4$.

$$LiBF_4 \leftrightarrows BF_3 + LiF$$

Hereinafter, the conveying method and the conveying system will be described in more detail with reference to FIG. 1 related to the conveying system 10 of solid particles.

The conveying system 10 shown in FIG. 1 includes a delivering means 21 to which solid particles that are to be conveyed have been introduced and that supplies the solid particles to a conveying path 24, the conveying path 24 that is connected to the delivering means 21 and that conveys the solid particles supplied from the delivering means 21, a receiving means 20 that is connected to the conveying path 24 and receives the solid particles from the conveying path 24, and a solid particle supply path 23 that supplies the solid particles to the delivering means 21.

As the delivering means 21 and the receiving means 20, for example, hoppers may be used. As the conveying path 24, a conveying pipe with a shape commonly used for pneumatic conveying may be used. Furthermore, various gas pipes constituting the delivering means 21, the receiving means 20, the conveying path 24, and the system 10 may be made of any material that is stable for the solid particles and constituent components of the gas flow, and is resistant to the pressure in the pneumatic conveying. Specific examples of the material include vinyl chloride, polypropylene, polyethylene, fluorine-based resins (PTFE, PFA, PVDF, etc.), and metal pipes (iron, stainless steel, alloy steel, etc.).

The conveying system 10 further includes a gas returning path 26 that connects the receiving means 20 and the delivering means 21, separately from the conveying path 24, a gas supply path 25 that is connected to the gas returning path 26 and introduces a gas containing a specific gas component into the gas returning path 26, and a blower 22 that is provided at a point on the gas returning path 26 and generates a floating flow, a fluidized flow, or a plug flow in the conveying path 24 through a pressure-feeding force or a suction force. In this system, the blower is an example of a circulating means.

In the conveying system 10, first, the solid particles are supplied via the solid particle supply path 23 to the delivering means 21. Furthermore, the gas containing the specific gas component is supplied from the gas supply path 25 to the gas returning path 26. The gas is fed by the blower 22 as a gas flow into the delivering means 21, and is transferred together with the solid particles to the conveying path 24. Furthermore, on the conveying path 24, the gas flow conveys the solid particles through the pressure-feeding force or the suction force generated by the blower 22, and causes the solid particles to reach the receiving means 20. The solid particles that have reached the receiving means 20 are stored without any processing or are sent to the next process. Meanwhile, the gas flow is separated from the solid particles at the receiving means 20, returned via the gas returning path 26 to the blower 22, again fed by the blower 22 to the delivering means 21 and the conveying path 24, and used to convey the solid particles. An unshown filter or the like may be provided on the gas returning path 26 between the receiving means 20 and the blower 22, in order to reliably separate the gas flow and the solid particles. Furthermore, an unshown transferring means for transferring the solid particles that have been conveyed to the receiving means 20 to another point may be provided.

According to the conveying system 10 with the above-described configuration and the conveying method using the same, the gas flow for conveying the solid particles contains a gas component that is generated through dissociation of the solid particles, and thus it is possible to convey the solid particles while suppressing dissociation of the solid particles.

Furthermore, in the conveying system 10, the receiving means 20 and the delivering means 21 are connected to each other via two paths consisting of the conveying path 24 and the gas returning path 26, and the gas returning path 26 and the conveying path 24 constitute a gas circulation path. With this configuration, it is possible to convey the solid particles along the conveying path 24 while circulating a gas flow containing a specific gas component.

All of the gas returning path 26 and the conveying path 24, and the receiving means 20 and the delivering means 21 are closed to the external space. As described above, these means and paths preferably form an airtight internal space that is kept airtight to the external space, and allow the gas flow containing a specific gas component to be circulated in the airtight internal space.

Furthermore, as shown in FIG. 1, the system 10 is preferably such that the gas returning path 26 and the conveying path 24 are connected to each other via a detour path 27 detouring around the delivering means 21. The detour path 27 is connected to each of the gas returning path 26 and the conveying path 24 near the delivering means 21. The portion of the gas returning path 26 between the point connected to the detour path 27 and the delivering means 21 (hereinafter, also referred to as a "first branch portion") 26a, and the portion of the conveying path 24 between the point connected to the detour path 27 and the delivering means 21 (hereinafter, also referred to as a "second branch portion") 24a are respectively provided with valves 26b and 24b. Furthermore, the detour path 27 is also provided with a valve 27b. With these valves, the first branch portion 26a, the second branch portion 24a, and the detour path 27 can be opened and closed independently of each other. Furthermore, if the detour path 27 is provided, it is preferable to use a pressure-feeding blower as the blower 22.

With the above-described configuration, for example, when the conveying path 24 is not clogged by the solid particles or a solid component generated through dissociation of the solid particles, the valve 27b in the detour path 27 is closed, and the valves 26b and 24b are opened. Accordingly, the gas flow from the blower 22 does not pass through the detour path 27, and is supplied mainly via the delivering means 21 to the conveying path 24 and is used to convey the solid particles.

On the other hand, when the conveying path 24 is clogged by the solid particles or a solid component generated through dissociation of the solid particles, the valve 27b in the detour path 27 is opened, and the valves 26b and 24b respectively in the first branch portion 26a and the second branch portion 24a are closed. Accordingly, the gas flow from the blower 22 does not pass through the delivering means 21, and is supplied via the detour path 27 to the conveying path 24. The gas flow that has passed through the detour path 27 has a high pressure because it does not receive a resistance by the solid particles. Thus, the solid particles or the solid component that has stuck to the conveying path 24 can be purged, and the clog in the conveying path 24 can be removed. After the clog is removed, it is possible to resume conveying of the solid particles by again closing the valve 27b in the detour path 27 and opening the valves 26b and 24b in the first branch portion 26a and the second branch portion 24a.

It is possible to detect that the conveying path 24 is clogged and to open and close the valves in the detour path 27, the first branch portion 26a, and the second branch portion 24a, using known means. For example, a clog detecting means as described in Patent Literature 2 can be used, and the above-described valves can be opened and closed by an unshown control means based on a detection result of the detecting means.

Above, the system 10 of this embodiment was described, but the present invention is not limited to the system 10. For example, it is also possible to convey solid particles with a suction force using a vacuum pump or the like instead of or in addition to the blower 22.

EXAMPLES

Hereinafter, the present invention will be described in more detail by way of examples. However, the scope of the present invention is not limited to the examples. In the examples below, "%" refers to "mass %" unless otherwise described.

Example 1

The conveying system 10 shown in FIG. 1 was used. The environment was at an ambient temperature of 10° C.

A hopper made of stainless steel was used as the delivering means 21. A hopper made of stainless steel located at a position higher than the delivering means 21 by 20 m and away from the delivering means 21 by 10 m in a direction parallel to the ground was used as the receiving means 20.

A pipe made of stainless steel with a diameter (inner diameter) of 5 cm and a length of 30 m was used as the conveying path 24 connecting the delivering means 21 and the receiving means 20.

First, 100 kg of an $LiPF_6$ powder with an average particle size of 0.22 mm was introduced from the solid particle supply path 23 to the delivering means 21. The valve 27b in the detour path 27 was closed, and the valves 26b and 24b in the first branch portion 26a and the second branch portion 24a were opened. A gas flow (with a moisture amount of 20 ppm in volume) containing $N_2$ gas: 99.98 vol % and $PF_5$ gas: 0.02 vol % was introduced from the gas supply path 25 to the gas returning path 26, and was introduced to the delivering means 21 by the blower 22 at a temperature of 10° C. and a suction pressure of the blower 22 of −20 kPaG, so that the gas flow was circulated in the conveying path 24 and the gas returning path 26. The $LiPF_6$ powder was fed at a high pressure in the conveying path 24 through the generated gas flow, and was caused to reach the receiving means 20 as a fluidized flow.

Comparative Example 1

An $LiPF_6$ powder was pneumatically conveyed as in Example 1, except that the composition of the gas flow was changed to $N_2$ gas: 100 vol %.

Example 2

In this example, 100 kg of an $LiPF_6$ powder that was introduced to the delivering means 21 was changed to 100 kg of an $LiBF_4$ powder with an average particle size of 0.13 mm. Furthermore, the composition of the gas flow was changed to $N_2$ gas: 90 vol % and $BF_3$ gas: 10 vol %. The $LiBF_4$ powder was pneumatically conveyed as in Example 1, except for these aspects.

Comparative Example 2

An $LiBF_4$ powder was pneumatically conveyed as in Example 2, except that the composition of the gas flow was changed to $N_2$ gas: 100 vol %.

The solid particles ($LiPF_6$ powder or $LiBF_4$ powder) that reached the receiving means 20 in the examples and comparative examples were evaluated as below.

Evaluation

As a solvent, 1.5 L of 1,2-dimethoxyethane was poured into a beaker, and the liquid temperature was set to 25° C. Then, 100 g of solid particles was placed into the beaker and dissolved by stirring for 3 minutes. The obtained solution was filtered through a PTFE (polytetrafluoroethylene)-type membrane filter (with a pore size of 0.1 m), so that the insoluble matter was filtered out, after which the insoluble matter was dried by a drier together with the membrane filter. Table 1 below shows the masses of the insoluble matter in the examples and comparative examples.

TABLE 1

| | Type of solid particles | Insoluble matter (g) |
|---|---|---|
| Example 1 | $LiPF_6$ | 0.011 |
| Comparative Example 1 | | 0.034 |
| Example 2 | $LiBF_4$ | 0.017 |
| Comparative Example 2 | | 0.028 |

As shown in Table 1, even when the same $LiPF_6$ powder is conveyed, the insoluble matter after the conveying was smaller in Example 1 using a gas flow containing $PF_5$ that is dissociated from $LiPF_6$ than in Comparative Example 1 using a gas flow not containing $PF_5$. Similar results were obtained in Example 2 and Comparative Example 2 in which an $LiBF_4$ powder was conveyed instead of an $LiPF_6$ powder.

An $LiPF_6$ powder and an $LiBF_4$ powder are readily soluble to the solvent used in the evaluation. Meanwhile, lithium fluoride LiF that is generated through dissociation of these powders is insoluble to the solvent. Accordingly, precipitation of the insoluble matter indicates alteration due to dissociation during conveying.

Above, it is seen that, according to the conveying method of the present invention, it is possible to convey solid particles made of a solid material that is capable of undergoing a dissociation equilibrium reaction that dissociates a gas component, while effectively suppressing dissociation of the solid particles.

INDUSTRIAL APPLICABILITY

According to the present invention, solid particles from which a gas component is capable of dissociation, which cannot be subjected to conventional pneumatic conveying methods, can be pneumatically conveyed while suppressing the dissociation. Thus, it is possible to flexibly select conveying vessels and conveying paths, and to significantly reduce the conveying cost.

The invention claimed is:

1. A method for conveying solid particles using a gas flow, comprising circulating the gas flow in a closed conveying path,
    wherein the solid particles comprise a solid material that is capable of undergoing a dissociation equilibrium reaction that dissociates at least one type of gas component and at least one type of solid component,
    the gas flow contains the gas component,
    the solid particles are conveyed in a conveying pipe by the gas flow, and the solid particles or the solid component stuck to an inner surface of the conveying pipe is removed by the gas flow; and
    the solid material is $LiPF_6$ or $LiBF_4$.

2. The conveying method according to claim 1, wherein an average particle size of the solid particles is from 0.1 to 1.0 mm.

3. The conveying method according to claim 2, wherein the solid particles are conveyed by the gas flow in a state of any of a floating flow, a fluidized flow, and a plug flow.

4. The conveying method according to claim 3, comprising:
    providing a delivering means for supplying the solid particles to the conveying path, a receiving means for receiving the solid particles from the conveying path, and a gas returning path that connects the delivering means and the receiving means, wherein the conveying path and the gas flow returning path constitute a gas circulation path; and
    providing a detour path detouring around the delivering means, in the gas circulation path, and supplying the gas flow for removing the solid particles or the solid component stuck to the inner surface of the conveying pipe, via the detour path to the conveying path.

5. The conveying method according to claim 2, comprising:
    providing a delivering means for supplying the solid particles to the conveying path, a receiving means for receiving the solid particles from the conveying path, and a gas returning path that connects the delivering means and the receiving means, wherein the conveying path and the gas flow returning path constitute a gas circulation path; and providing a detour path detouring around the delivering means, in the gas circulation path, and supplying the gas flow for removing the solid particles or the solid component stuck to the inner surface of the conveying pipe, via the detour path to the conveying path.

6. The conveying method according to claim 1, wherein the solid particles are conveyed by the gas flow in a state of any of a floating flow, a fluidized flow, and a plug flow.

7. The conveying method according to claim 6, comprising:

providing a delivering means for supplying the solid particles to the conveying path, a receiving means for receiving the solid particles from the conveying path, and a gas returning path that connects the delivering means and the receiving means, wherein the conveying path and the gas flow returning path constitute a gas circulation path; and providing a detour path detouring around the delivering means, in the gas circulation path, and supplying the gas flow for removing the solid particles or the solid component stuck to the inner surface of the conveying pipe, via the detour path to the conveying path.

8. The conveying method according to claim 1, comprising:

providing a delivering means for supplying the solid particles to the conveying path, a receiving means for receiving the solid particles from the conveying path, and a gas returning path that connects the delivering means and the receiving means, wherein the conveying path and the gas flow returning path constitute a gas circulation path; and providing a detour path detouring around the delivering means, in the gas circulation path, and supplying the gas flow for removing the solid particles or the solid component stuck to the inner surface of the conveying pipe, via the detour path to the conveying path.

\* \* \* \* \*